United States Patent
Ratzlaff et al.

(10) Patent No.: US 11,008,889 B2
(45) Date of Patent: May 18, 2021

(54) TURBINE ENGINE HANGER

(71) Applicant: GENERAL ELECTRIC COMPANY, Schenectady, NY (US)

(72) Inventors: Jonathan Russell Ratzlaff, Loveland, OH (US); Aaron Ezekiel Smith, Hermosa Beach, CA (US)

(73) Assignee: General Electric Company, Schenectady, NY (US)

( * ) Notice: Subject to any disclaimer, the term of this patent is extended or adjusted under 35 U.S.C. 154(b) by 94 days.

(21) Appl. No.: 16/356,491

(22) Filed: Mar. 18, 2019

(65) Prior Publication Data
US 2020/0300116 A1 Sep. 24, 2020

(51) Int. Cl.
*F01D 25/14* (2006.01)
*B04C 3/06* (2006.01)
*B04C 3/00* (2006.01)

(52) U.S. Cl.
CPC .............. *F01D 25/14* (2013.01); *B04C 3/06* (2013.01); *B04C 2003/006* (2013.01); *F05D 2240/14* (2013.01); *F05D 2260/201* (2013.01); *F05D 2260/202* (2013.01); *F05D 2260/607* (2013.01)

(58) Field of Classification Search
None
See application file for complete search history.

(56) References Cited

U.S. PATENT DOCUMENTS

| | | | |
|---|---|---|---|
| 5,853,440 A | 12/1998 | Dyson | |
| 5,893,936 A | 4/1999 | Dyson | |
| 6,277,278 B1 * | 8/2001 | Conrad | B04C 3/00 210/512.1 |
| 7,922,794 B2 | 4/2011 | Morphey | |
| 8,176,720 B2 * | 5/2012 | Beeck | F01D 5/08 60/39.092 |
| 8,997,310 B2 | 4/2015 | Davidshofer et al. | |
| 9,132,372 B2 | 9/2015 | Zecchi et al. | |
| 9,339,749 B2 | 5/2016 | Thompson et al. | |
| 9,915,176 B2 * | 3/2018 | Murray | F01D 25/24 |
| 9,945,388 B2 | 4/2018 | Palomba et al. | |
| 9,988,936 B2 * | 6/2018 | Nasr | F01D 9/04 |
| 2002/0166200 A1 * | 11/2002 | Conrad | B01D 45/16 15/353 |
| 2009/0202337 A1 * | 8/2009 | Bosley | F01D 25/246 415/1 |
| 2011/0067409 A1 | 3/2011 | Beeck | |
| 2016/0123227 A1 | 5/2016 | Murray et al. | |
| 2017/0370287 A1 | 12/2017 | Pearson et al. | |
| 2018/0021711 A1 | 1/2018 | Mook et al. | |
| 2018/0023473 A1 | 1/2018 | Manteiga et al. | |
| 2018/0023595 A1 | 1/2018 | Mook et al. | |
| 2018/0169669 A1 | 6/2018 | Himmelmann | |

FOREIGN PATENT DOCUMENTS

EP 2156941 A1 2/2010

* cited by examiner

*Primary Examiner* — Justin D Seabe
*Assistant Examiner* — Jason G Davis
(74) *Attorney, Agent, or Firm* — McGarry Bair PC

(57) ABSTRACT

A hanger for a turbine engine can include a first surface confronting a cooling airflow, a second surface facing a heated airflow, and a third surface radially outward of the first surface. The hanger can also include a cyclonic separator with a dirty air inlet and a clean air outlet, as well as a cooling air circuit extending through the cyclonic separator.

18 Claims, 6 Drawing Sheets

TURBINE ENGINE HANGER

BACKGROUND

Turbine engines, and particularly gas or combustion turbine engines, are rotary engines that extract energy from a flow of pressurized combusted gases passing through the engine onto rotating turbine blades.

Turbine engines are often designed to operate at high temperatures to improve engine efficiency. It is beneficial to provide cooling measures for components such as airfoils in the high-temperature environment, where such cooling measures can reduce material wear on these components and provide for increased structural stability during engine operation.

The cooling measures can include bleed air from the compressor that is routed to the desired location in the engine. The bleed air can be utilized to provide purge air flow at specific component interfaces. Optimizing bleed air delivery and coverage further helps to improve the engine efficiency.

BRIEF DESCRIPTION

In one aspect, the disclosure relates to a hanger for a turbine engine. The hanger includes a first surface confronting a cooling airflow, a second surface facing a heated airflow, a third surface radially outward of the second surface, a cyclonic separator with a cyclone body at least partially defined by the third surface and having a dirty air inlet, a clean air outlet, and a scavenge outlet positioned radially outward of the clean air outlet, and a cooling air circuit having a cooling air inlet on the first surface and a cooling air outlet on the second surface and extending through the cyclonic separator between the dirty air inlet and the clean air outlet.

In another aspect, the disclosure relates to a shroud and hanger assembly for a turbine engine. The shroud and hanger assembly includes a hanger with a first surface confronting a cooling airflow, a second surface facing a heated airflow, a third surface radially outward of the second surface, a cyclonic separator with a cyclone body at least partially defined by the third surface and having a dirty air inlet, a clean air outlet, and a scavenge outlet positioned radially outward of the clean air outlet, and a cooling air circuit having a cooling air inlet on the first surface and a cooling air outlet on the second surface and extending through the cyclonic separator between the dirty air inlet and the clean air outlet. The shroud and hanger assembly also includes a shroud with an inner surface confronting the second surface of the hanger, a heated surface facing the heated airflow, and a shroud cooling circuit fluidly coupled to the cooling air circuit and extending through the shroud between a shroud inlet on the inner surface and a shroud outlet on the heated surface.

In yet another aspect, the disclosure relates to a turbine engine including a compressor, a combustor, and a turbine in axial flow arrangement. The turbine engine includes a cooled component having an interior cooling passage and a heated surface facing a heated airflow, and a hanger with a first surface confronting a cooling airflow, a second surface facing the heated airflow, a third surface radially outward of the second surface, a cyclonic separator with a cyclone body at least partially defined by the third surface and having a dirty air inlet, a clean air outlet, and a scavenge outlet positioned radially outward of the clean air outlet, and a cooling air circuit fluidly coupled to the interior cooling passage, the cooling air circuit having a cooling air inlet on the first surface and a cooling air outlet on the second surface and extending through the cyclonic separator between the dirty air inlet and the clean air outlet.

DETAILED DESCRIPTION

Figure 1:
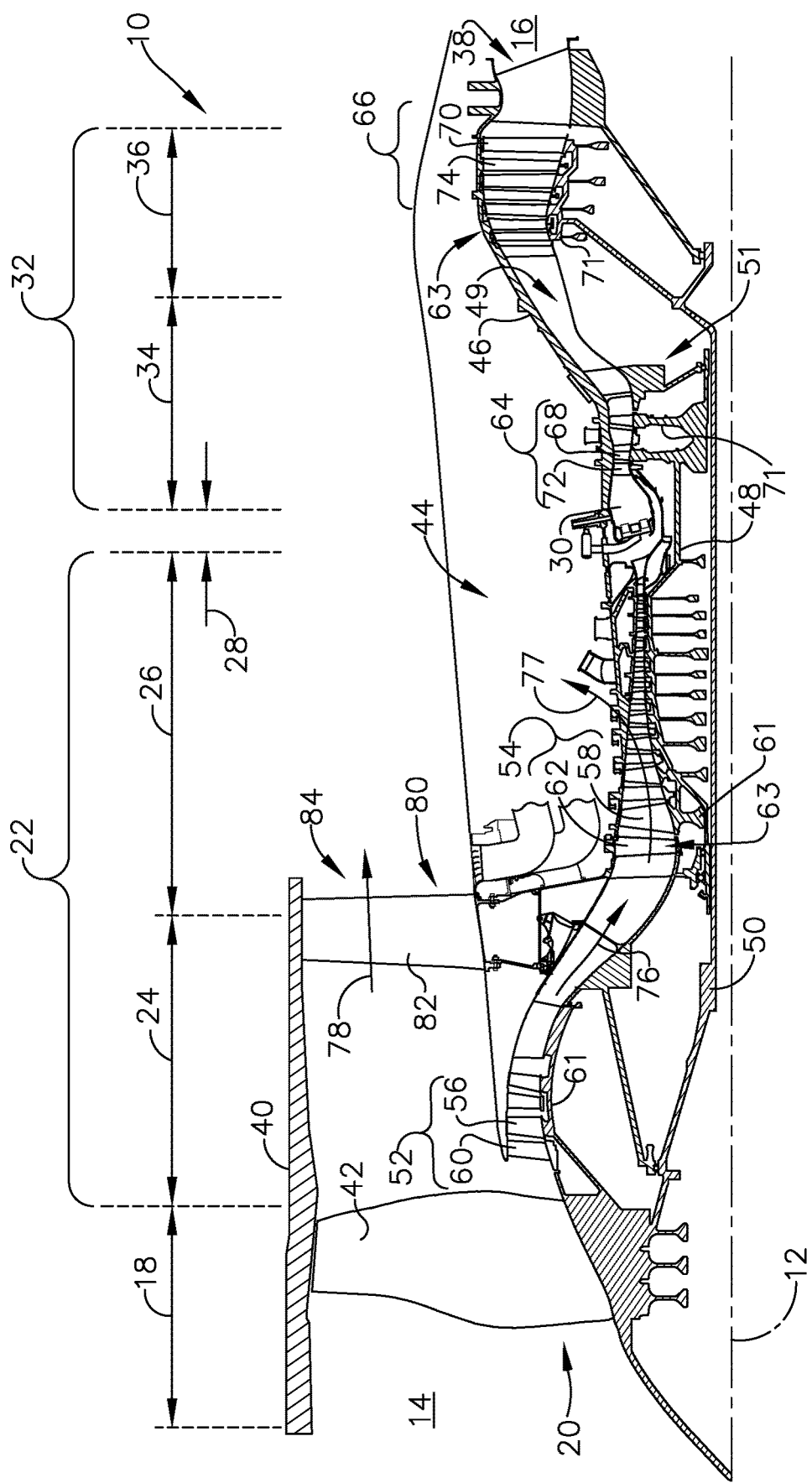
FIG. 1 is a schematic cross-sectional diagram of a turbine engine for an aircraft.

The described embodiments of the present disclosure are directed to a shroud and hanger assembly for a turbine engine. For purposes of illustration, the present disclosure will be described with respect to the turbine section in an aircraft turbine engine. It will be understood, however, that the disclosure is not so limited and may have general applicability within an engine, including in a compressor section of a turbine engine, as well as in non-aircraft applications, such as other mobile applications and non-mobile industrial, commercial, and residential applications.

Cooling airflows within turbine engines can carry dust or other debris that can move into cooled components such as shrouds, hangers, airfoils, platforms, inner or outer bands, or the like. Such dust or debris can collect within the interior of cooled components or cause blockages within cooling holes or passages. The removal of such debris can improve cooling performance and provide for reduced usage of cooling air.

Turbine engines can also include components formed at least partially by additive manufacturing. As used herein, an "additively manufactured" component will refer to a component formed by an additive manufacturing (AM) process, wherein the component is built layer-by-layer by successive deposition of material. AM is an appropriate name to describe the technologies that build 3D objects by adding layer-upon-layer of material, whether the material is plastic or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. In addition, an "additively manufactured" component can also include a component formed by investment casting, 3D printing, additive metal, or any combination thereof.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

As used herein, "a set" can include any number of the respectively described elements, including only one element. Additionally, the terms "radial" or "radially" as used herein refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54 having blade assemblies 55 and vane assemblies 57. Each blade assembly 55 includes a set of compressor blades 56, 58 that rotate relative to each vane assembly 57 having a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

Figure 2:
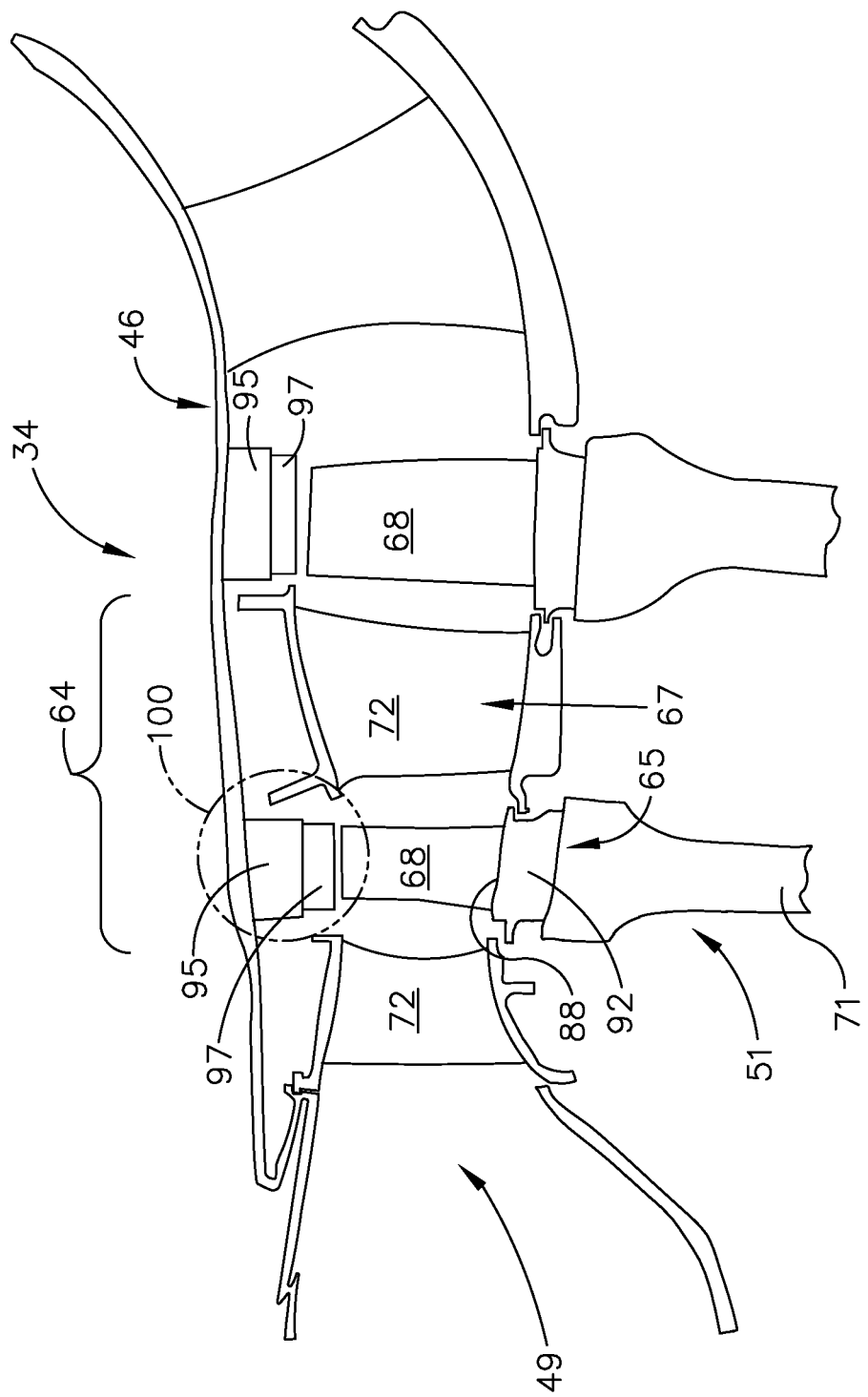
FIG. 2 is an enlarged view of a high pressure turbine section of the turbine engine from FIG. 1 including a shroud and hanger assembly according to various aspects described herein.

The HP turbine 34 and the LP turbine 36 respectively include a plurality of turbine stages 64, 66, having blade assemblies 65 and vane assemblies 67 (FIG. 2). Each blade assembly 65 includes a set of turbine blades 68, 70 that rotate relative to each vane assembly 67 having a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

FIG. 2 is an enlarged view of a portion FIG. 1 more clearly illustrating half of an annular channel 49 at the HP turbine 34; it should be understood that the HP turbine 34 can include additional components not illustrated. The HP turbine 34 can include multiple turbine stages 64. Each turbine stage 64 can include pairs of airfoil assemblies, and is illustrated as including the exemplary blade and vane assemblies 65, 67. While an HP turbine 34 is illustrated, aspects of the present disclosure can be applied to other areas of the engine including the LP turbine 36 and the compressor section 22, and also including the exemplary blade and vane assemblies 55, 57 (FIG. 1). In addition, it should be understood that the HP turbine 34 can include more or fewer stages 64 than illustrated, and that the stages 64 are for illustrative purposes only.

The blade and vane assemblies 65, 67 are provided within the annular channel 49 in a circumferentially-spaced arrangement of blades 68 and vanes 72 through which the flow of combustion gases can move. The blade assemblies 65 can include the blades 68 mounted to blade platforms 88 and extending radially out from dovetails 90. The dovetails 90 are mounted to the disk 71, which are collectively connected to form the rotor 51.

A plurality of hangers 95 are schematically illustrated as being coupled to the core casing 46 (FIG. 1) and configured to support a corresponding plurality of annular shrouds 97, where each of the shrouds 97 surrounds corresponding blades 68. Together the hanger 95 and shroud 97 can define a shroud and hanger assembly 100. The hangers 95 and shrouds 97 are illustrated in FIG. 2 with rectangular geometric profiles for clarity, and it should be understood that any desired geometric profile can be utilized. In addition, either or both of the hangers 95 and shrouds 97 can include attachment arms, seals, interior cavities, baffles, or any other desired component suitable for the environment of the shroud and hanger assembly 100.

Figure 3:
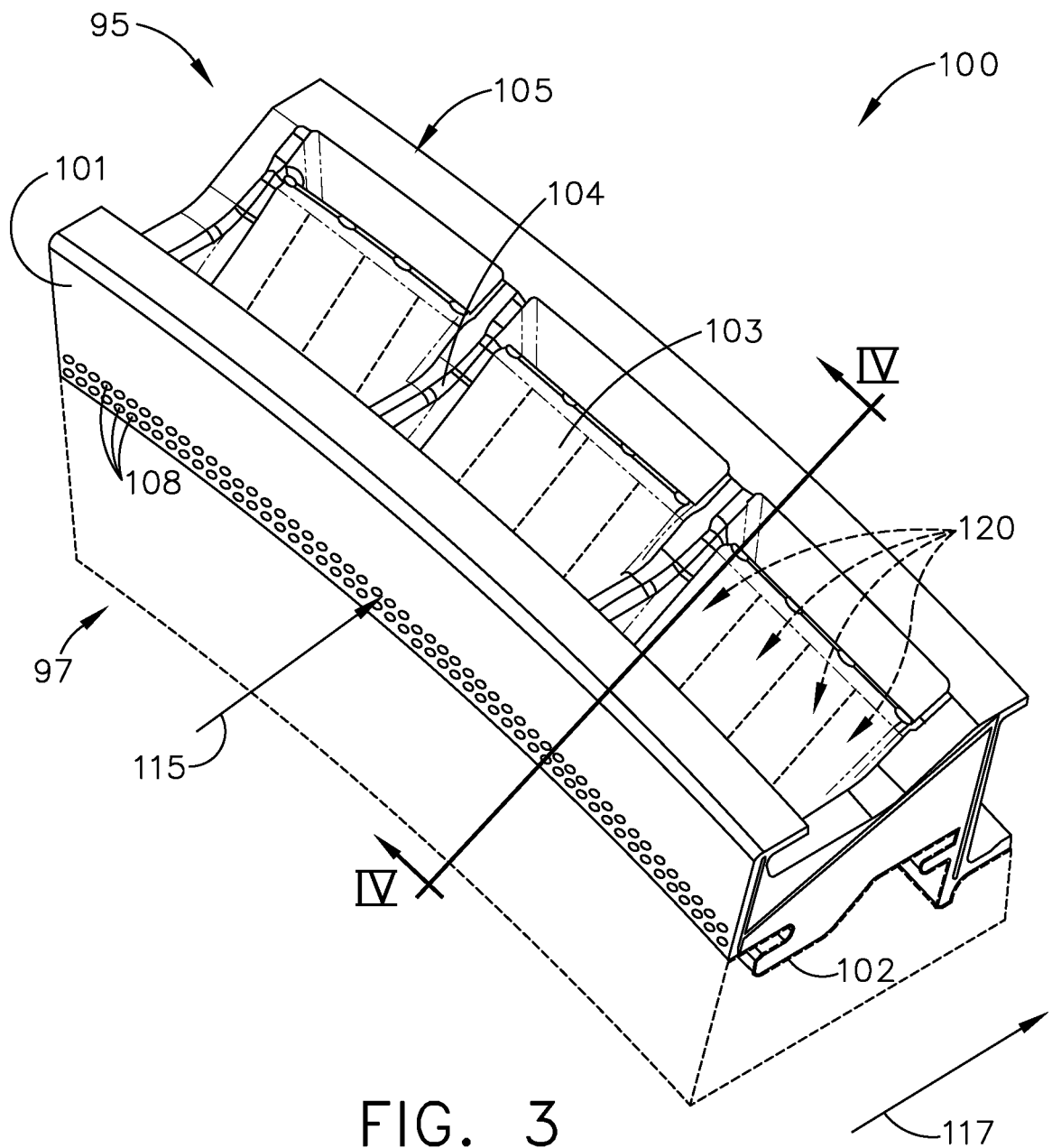
FIG. 3 is a perspective view of a portion of the shroud and hanger assembly of FIG. 2.

Further details of the shroud and hanger assembly 100 are shown in FIG. 3. The hanger 95 can include a first surface 101 confronting a cooling airflow 115, a second surface 102 facing a heated airflow 117, and a third surface 103 radially outward of the second surface 101. In the example shown, the second surface 102 of the hanger 95 is spaced from the heated airflow 117 by the shroud 97. It should also be understood that the hanger 95 can form a section of an annular shroud and hanger assembly. In the example shown, the hanger 95 and shroud 97 form a portion of the annular shroud and hanger assembly 100 that circumscribes the HP turbine 34 and surrounds the corresponding blades 68.

A cyclonic separator 120 can be included within the hanger 95. It is contemplated that the hanger 95 can have a monolithic body 105, where the third surface 103 at least partially defines the cyclonic separator 120. In such a case the cyclonic separator 120 can unitarily formed with the hanger 95, such as through additive manufacturing. As illustrated, the monolithic body 105 includes multiple cyclonic separators 120, which are in a circumferentially-spaced arrangement in the monolithic body. Any number of cyclonic separators 120 can be included. In addition, diagonal load braces 104 can be provided along the third surface 103 for added structural stability of the hanger 95. In such a case, multiple cyclonic separators 120 can be included between adjacent diagonal load braces 104 as shown.

The cyclonic separator 120 can also form part of an internal conduit within the hanger 95 for the cooling airflow 115. For example, a set of cooling air inlets 108 can be formed in the first surface 101 of the hanger 95, such that the cooling airflow 115 can enter the body of the hanger 95. Any number, size, or shape of cooling air inlets 108 can be utilized.

Figure 4:
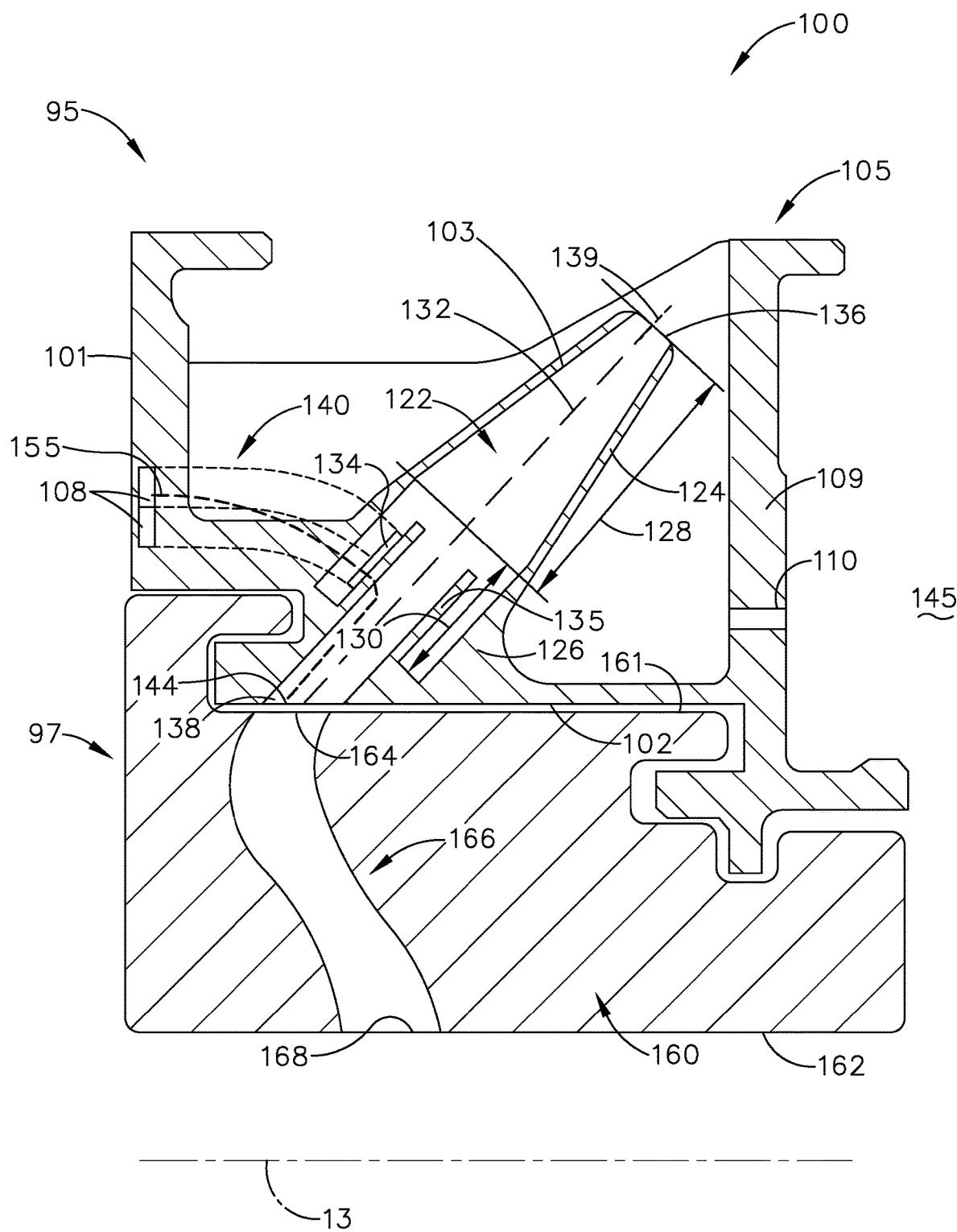
FIG. 4 is a cross-sectional view of the shroud and hanger assembly of FIG. 3 along line IV-IV including a cyclonic separator.

FIG. 4 illustrates a sectional view of the shroud and hanger assembly 100. A reference line 13 is shown that is generally representative of, and parallel to, the engine centerline 12. The cyclonic separator 120 can include a cyclone body 122 having a conical portion 124 and a cylindrical portion 126, as well as a centerline 132 as shown. In the example shown, the conical portion 124 and cylindrical portion 126 of the cyclonic separator 120 are aligned with the centerline 132 as shown. In other, non-limiting examples (not shown), the conical portion 124 and cylindrical portion 126 can be unaligned with the centerline 132, or each can be parallel to and offset from the centerline 132.

It is further contemplated that the centerline 132 of the cyclonic separator 120 can be unaligned with the centerline 12 of the turbine engine 10. For example, the cyclonic separator 120 can be oriented at an angle such that its centerline 132 is parallel to the diagonal load brace 104 (FIG. 2).

The cyclonic separator 120 can further include a tangential dirty air inlet 134, a scavenge outlet 136, and a clean air outlet 138. As shown, the dirty air inlet 134 and clean air outlet 138 are located in the cylindrical portion 126, and the scavenge outlet 136 is located in the conical portion 124. In addition, the scavenge outlet 136 can be positioned radially outward of the clean air outlet 138. The dirty air inlet 134 can also be positioned radially outward of the clean air outlet 138, such as between the clean air outlet 138 and the scavenge outlet 136.

A clean air conduit 135 can be positioned within the cyclonic separator 120 adjacent the dirty air inlet 134 and clean air outlet 138, and fluidly coupled to the scavenge outlet 136. The clean air conduit 135 can have an annular geometric profile about the centerline 132. In the example shown, the clean air conduit 135 can at least partially extend over, and be spaced from, the dirty air inlet 134 to prevent air from flowing directly from the dirty air inlet 134 to the clean air outlet 138.

An inlet conduit 140 can extend into the monolithic body 105 and fluidly couple the cooling air inlets 108 and the dirty air inlet 134. In an alternate example (not shown), the dirty air inlet can be positioned on the first surface 101 to define the cooling air inlet, with no inlet conduit utilized. In still another example (not shown), a single cooling air inlet can be fluidly coupled to multiple cyclonic separators. It will also be understood that while illustrated with two cooling air inlets 108 fluidly coupled to the inlet conduit 140, any number of cooling air inlets 108 can be utilized, including a single cooling air inlet 108 coupled to a single inlet conduit 140.

A cooling air outlet 144 can be formed on the second surface 102 of the monolithic body 105, and an outlet conduit 142 can extend into the cyclone body 122 and fluidly couple the clean air outlet 138 and the cooling air outlet 144. In this manner, the monolithic body 105 can define a cooling air circuit 155 between the cooling air inlet 108 on the first surface 101 and the cooling air outlet 144 on the second surface 102. The cooling air circuit 155 can pass through the cyclonic separator 120 between the dirty air inlet 134 and the clean air outlet 138 as shown. It is further contemplated that the clean air outlet 138 can have an outlet centerline 139 that is aligned with the centerline 132.

It should be understood that air exiting the clean air outlet 138 can still carry some dirt or debris, wherein the majority of dirt or debris entering the cyclonic separator 120 can exit via the scavenge outlet 136. Where "clean air" is described herein, it should be understood that "clean" can refer to the removal of a portion less than the entirety of contaminants that may be present in the airflow. It should also be understood that in an example where the monolithic body 105 defines multiple cyclonic separators 120 (FIG. 3), multiple cooling air circuits 155 can extend through each of the corresponding multiple cyclonic separators 120.

In addition, the conical portion 124 can define a first length 128, and the cylindrical portion 126 can define a second length 130. In the illustrated example the first length 128 is greater than the second length 130. However, it is also contemplated that the first length 128 can also be equal to, or less than, the second length 130. The first length 128, second length 130, and ratio of the lengths 128, 130 can be tailored to adjust any or all of an airflow speed within the cyclonic separator 120, a rate of contaminant removal from an airflow within the cyclonic separator 120, or a dust/debris particle size limit to be removed from the airflow within the cyclonic separator 120. In one example, faster airflows through the separator 120 can cause increased rates of particle removal via the scavenge outlet 136. In another example, slower airflows can provide for removing larger particle sizes from the airflow.

The hanger 95 can further include an aft wall 109 having at least one bleed hole 110. The at least one bleed hole 110 is illustrated for clarity as a single hole extending through the aft wall 109. It will be understood the at least one bleed hole 110 can include multiple holes, any or all of which can be straight or curved and can have any suitable centerline angle with respect to the aft wall 109. The bleed hole 110 can be fluidly coupled to the scavenge outlet 136 as well as to a benign region 145 of the turbine engine 10. As used herein, a "benign region" will refer to a region of the turbine engine 10 that is not adversely affected by the presence of dust or debris, or has a sufficient tolerance to the presence of dust or debris such that performance or efficiency of the turbine engine 10 is not reduced by an undesirable amount. For example, some regions within the engine 10 such as an upstream or downstream purge cavity can be cooled or prevented from ingesting hot combustion gas flows by the use of cooling air, even as debris may be present within the cooling air. "Benign region" can also refer to a region of the turbine engine 10 that is easily accessed or cleaned such that any accumulated dust or debris can be easily removed.

The shroud 97 can be coupled to the hanger 95 to form the shroud and hanger assembly 100. The shroud 97 can include a shroud body 160 with an inner surface 161 confronting the second surface 102 of the hanger 95 and a heated surface 162 facing the heated airflow 117. A shroud cooling circuit 166 can extend through the shroud body 160 between a shroud inlet 164 on the inner surface 161 and a shroud outlet 168 on the heated surface 162. For clarity, the shroud cooling circuit 166 is illustrated schematically as a single passage extending through the shroud body 160. It will be understood that the shroud cooling circuit 166 can further include a plurality of passages, cavities, or other internal features (not shown), and can be formed with any desired size, geometry, or shape within the shroud body 160. In one non-limiting example the shroud cooling circuit 166 can be in the form of a plurality of film holes extending between the inner surface 161 and the heated surface 162. In another non-limiting example the shroud cooling circuit 166 can include a plurality of fluidly-coupled internal passages within the interior of the shroud body 160.

It is contemplated that the shroud cooling circuit 166 can be fluidly coupled to the cooling air circuit 155 in the hanger 95. More specifically, the shroud inlet 164 can be fluidly coupled to the clean air outlet 138 at the cylindrical portion 126 of the cyclone body 122.

Figure 5:
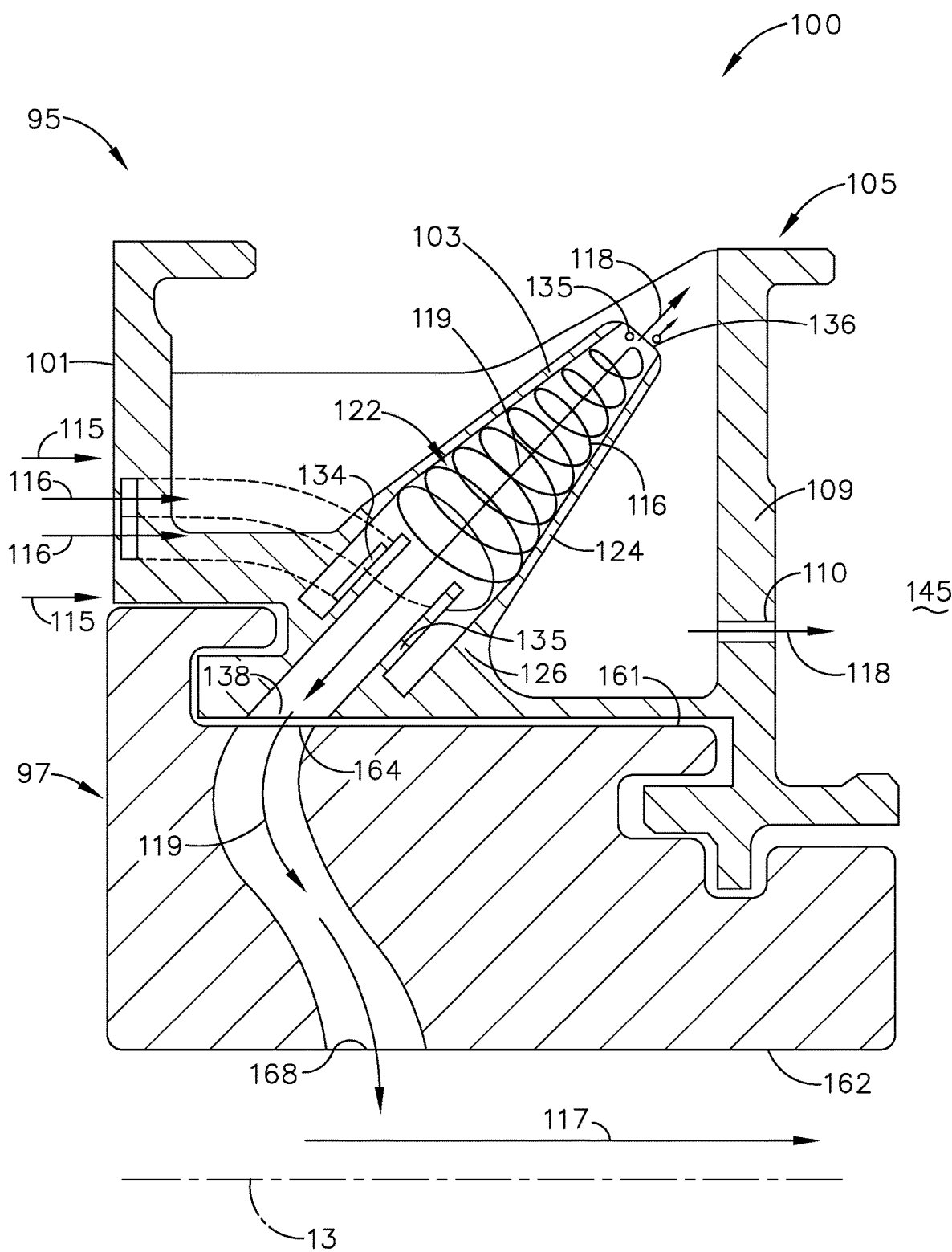
FIG. 5 is a cross-sectional view of the shroud and hanger assembly of FIG. 4 illustrating airflows within the cyclonic separator.

FIG. 5 illustrates air flowing through the shroud and hanger assembly 100 during operation of the engine 10 (FIG. 1). Debris-laden cooling air 116 (illustrated with arrows) can enter the monolithic body 105 through the cooling air inlet 108 and flow into the cyclone body 122 via the dirty air inlet 134. A portion of the debris-laden cooling air 116 can move through the scavenge outlet 136 to define a scavenge airflow 118. The remaining portion of the debris-laden cooling air 116 can define a cleaned cooling airflow 119 that moves through the clean air outlet 138.

The dirty air inlet 134 can form a tangential inlet such that the debris-laden cooling air 116 can swirl within the cyclone body 122 around the clean air conduit 135 and move toward the conical portion 124. The converging sloped walls of the conical portion 124 can cause the swirling cooling airflow 116 to increase in speed while moving toward the scavenge outlet 136. Dust, dirt, or other debris 135 within the swirling cooling air 116 can have sufficient momentum to exit the scavenge outlet 136 within the scavenge airflow 118. The cleaned cooling airflow 119 can be redirected back toward the cylindrical portion 126. The cleaned cooling airflow 119 can then flow through the outlet conduit 142 and exit the hanger 95 via the clean air outlet 138. In this manner the cooling air circuit 155 can extend through both the conical portion 124 and cylindrical portion 126 of the cyclonic separator 120.

It is also contemplated that the scavenge outlet 136 of the cyclonic separator 120 can be fluidly separated from the shroud cooling circuit 166 such that debris 135 is prevented from entering the shroud cooling circuit 166. In addition, the scavenge airflow 118 can exit the hanger 95 via the at least one bleed hole 110 and enter the benign region 145. For example, the scavenge airflow 118 can flow through the bleed hole 110 and enter the main combustion gas flow (not shown) downstream of the hanger 95. It is contemplated that the scavenge airflow 118 through the at least one bleed hole 110 can have a flow rate less than a flow rate of cleaned cooling air through the clean air outlet 138. In another example, the scavenge airflow 118 through the at least one bleed hole 110 can have a flow rate less than a flow rate of debris-laden cooling air 116 entering the dirty air inlet 134.

After exiting the hanger 95, the cleaned cooling airflow 119 can enter the shroud 97 via the shroud inlet 164. Further, cleaned cooling airflow 119 exiting multiple cyclonic separators 120 of the monolithic body 105 (FIG. 3) can enter at least one shroud inlet 164. In one example, each shroud inlet 164 can be coupled to a corresponding single clean air outlet 138 of the hanger 95. In another non-limiting example, multiple clean air outlets of the hanger can be fluidly coupled to a single shroud inlet; in still another example, a single clean air outlet of the hanger can be fluidly coupled to multiple shroud inlets. After entering the shroud 97, the cooling air 116 can then flow through the shroud cooling circuit 166 and exit the shroud 97 via the shroud outlet 168. In non-limiting examples, the exiting cooling air 116 can be utilized for cooling the heated surface 162 of the shroud 97 or as purge air for regions of the engine 10 proximate the shroud and hanger assembly 100.

While the cooled component is illustrated as the shroud 97, this is by way of example and is not intended to limit aspects of the disclosure described herein. It is contemplated that the cooling air circuit 155 of the hanger 95 can be fluidly coupled to any cooled component within the turbine engine 10 having any suitable cooling passage, as well as a heated surface facing a heated fluid flow. Such a cooling passage of the cooled component can be fluidly coupled to at least one of the multiple cooling air circuits 155 of the hanger 95. It will be understood that any cooled component within the engine 10, including a cooled airfoil such as a rotating blade or a stationary vane, can be fluidly coupled to the hanger 95 and cyclonic separator 120.

It will be understood that the shroud cooling circuit 166 can include any desired or suitable form of cooling circuit, including those not explicitly illustrated. In one example, the shroud cooling circuit can be in the form of at least one film hole (not shown) extending between the shroud inlet and shroud outlet. In another example, the shroud cooling circuit can include multiple interior cooling passages (not shown) fluidly coupled to the shroud inlet and shroud outlet, through which cleaned cooling air from the cyclonic separator can flow and provide cooling for the shroud body. In still another example (not shown), the shroud cooling circuit can include a combination of film holes, cooling passages, and other fluidly connected conduits extending through and within the shroud to provide cooling air to the shroud.

Figure 6:
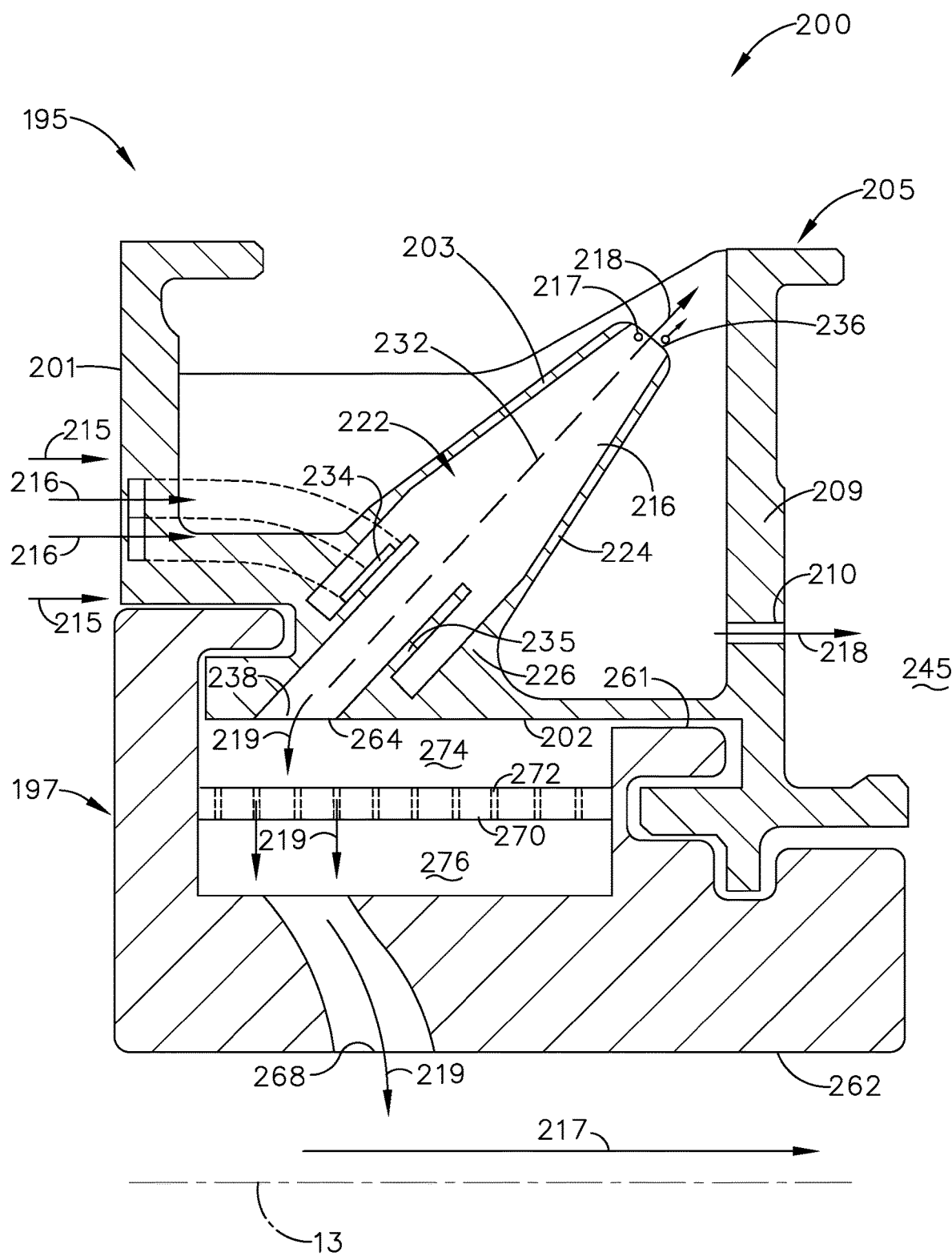
FIG. 6 is a cross-sectional view of another shroud and hanger assembly with a cyclonic separator according to various aspects described herein.

Turning to FIG. 6, another shroud and hanger assembly 200 is illustrated that can be utilized in the turbine engine 10 of FIG. 1. The shroud and hanger assembly 200 is similar to the shroud and hanger assembly 100; therefore, like parts will be identified with like numerals increased by 100, with it being understood that the description of the like parts of the shroud and hanger assembly 100 applies to the shroud and hanger assembly 200, except where noted.

The shroud and hanger assembly 200 includes a hanger 195 with a first surface 201 confronting a cooling airflow 215, a second surface 202 confronting a heated airflow 217, and a third surface 203 radially outward of the second surface 202. The hanger 195 also includes a cyclonic separator 220 with a cyclone body 222 having a dirty air inlet 234, a scavenge outlet 236, and a clean air outlet 238. The cyclone body 222 can also have a conical portion 224, cylindrical portion 226, and centerline 232 as shown. It is also contemplated that the hanger 195 can include a monolithic body 205 having the first surface 201, second surface 202, third surface 203, and cyclonic separator 220.

A cooling air circuit 255 can extend through the hanger 195. The cooling air circuit 255 can include a cooling air inlet 244 on the first surface 201 and a cooling air outlet 244 on the second surface 202. The cooling air circuit 255 can also extend through the cyclonic separator 220 between the dirty air inlet 234 and the clean air outlet 238.

The shroud and hanger assembly 200 can also include a shroud 197 with an inner surface 261 confronting the second surface 202 of the hanger 195, as well as a heated surface 262 facing the heated airflow 217. The shroud 197 can also include a shroud cooling circuit 266 fluidly coupled to the cooling air circuit 244 between a shroud inlet 264 on the inner surface 261 and a shroud outlet 268 on the heated surface 262.

One difference is that a baffle 270 can be included in the shroud and hanger 200. The baffle 270 can include a set of perforations 272 as shown. The baffle 270 can be positioned between the second surface 202 of the hanger 195 and the inner surface 261 of the shroud 197. In the illustrated example, a pre-impingement cavity 274 is defined between the baffle 270 and the second surface 202 of the hanger 195, and a post-impingement cavity 276 is defined between the baffle 270 and the inner surface 261 of the shroud 197.

During operation, debris-laden cooling air 216 can flow through the cooling air circuit 255 and enter the cyclonic separator 220. Cleaned cooling air 219 can exit the cyclonic separator 220 via the clean air outlet 238, enter the pre-impingement cavity 274, and impinge and flow through the perforated baffle 270. The cleaned cooling air 219 can then enter the post-impingement cavity 276 and impinge the inner surface 261 of the shroud 197 to cool the shroud 197. The cleaned cooling air 219 can also enter the shroud inlet 264, flow through the shroud cooling circuit 266, and flow through the shroud outlet 268. In one example, the shroud cooling circuit 266 can include at least one internal cooling passage where the cleaned cooling air 219 can provide for heat reduction within the shroud 197. In another example, the shroud outlet 268 can be in the form of at least one film hole, where the cleaned cooling air 219 can provide cooling for the heated surface 262 of the shroud 197. In still another example, the shroud outlet 268 can be in the form of at least one ejection hole to reduce possible stagnation proximate the heated surface 262.

Aspects of the present disclosure provide for a variety of benefits, including an increase in component lifetime in engines that operate in high dust environments. It can be appreciated that the hanger with cyclonic separator can provide for cleaned cooling air without need of additional upstream separators or other debris removal components, and removal of debris can improve cooling performance of the cooling air. Improved cooling performance can provide for less cooling air supplied to the cooled engine components, improving engine efficiency during operation.

In addition, the use of an additively-manufactured hanger with integrated cyclonic separator can provide for custom-tailored geometry of internal cooling passages, conduits, inlets, outlets, or shaping of walls such that a rate of dust removal, or a type or size of dust removal, can be optimized. For example, one portion of the annular shroud and hanger assembly may be tailored to remove dust particles larger than a predetermined size, where another portion of the annular shroud and hanger assembly can be tailored to remove as much dust as possible regardless of particle size.

It should be understood that application of the disclosed design is not limited to turbine engines with fan and booster sections, but is applicable to turbojets and turboshaft engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A hanger for a turbine engine comprising:
a first surface confronting a cooling airflow;
a second surface facing a heated airflow;
a third surface radially outward of the second surface;
a diagonal load brace along the third surface;
a cyclonic separator with a cyclone body having a conical portion and a cylindrical portion and defining a centerline parallel to the diagonal load brace, the cyclone body at least partially defined by the third surface and having a dirty air inlet, a clean air outlet, and a scavenge outlet positioned radially outward of the clean air outlet; and
a cooling air circuit having a cooling air inlet on the first surface and a cooling air outlet on the second surface and extending through the cyclonic separator between the dirty air inlet and the clean air outlet.

2. The hanger of claim 1 wherein the dirty air inlet is positioned radially outward of the clean air outlet.

3. The hanger of claim 1, further comprising multiple cyclonic separators and multiple cooling air circuits each extending through corresponding multiple cyclonic separators.

4. The hanger of claim 1 wherein both the conical and cylindrical portions are aligned with the centerline.

5. The hanger of claim 4 wherein the clean air outlet is aligned with the centerline.

6. The hanger of claim 1 wherein at least one of the dirty air inlet or the clean air outlet are located in the cylindrical portion.

7. The hanger of claim 6 wherein the scavenge outlet is located in the conical portion.

8. The hanger of claim 1, further comprising an inlet conduit extending through the first surface and fluidly coupling the cooling air inlet to the dirty air inlet.

9. The hanger of claim 1, further comprising an outlet conduit extending through the second surface and fluidly coupling the clean air outlet and the cooling air outlet.

10. The hanger of claim 1, further comprising a monolithic body having the first surface, second surface, third surface, and cyclonic separator.

11. A shroud and hanger assembly for a turbine engine comprising:
a hanger, comprising:
a first surface confronting a cooling airflow;
a second surface facing a heated airflow;
a third surface radially outward of the first second surface;
a diagonal load brace along the third surface;
a cyclonic separator with a cyclone body having a conical portion and a cylindrical portion and defining a centerline parallel to the diagonal load brace, the cyclone body at least partially defined by the third surface and having a dirty air inlet, a clean air outlet, and a scavenge outlet positioned radially outward of the clean air outlet; and
a cooling air circuit having a cooling air inlet on the first surface and a cooling air outlet on the second surface and extending through the cyclonic separator between the dirty air inlet and the clean air outlet; and
a shroud, comprising:
an inner surface confronting the second surface of the hanger;
a heated surface facing the heated airflow; and
a shroud cooling circuit fluidly coupled to the cooling air circuit and extending through the shroud between a shroud inlet on the inner surface and a shroud outlet on the heated surface.

12. The shroud and hanger assembly of claim 11 wherein the dirty air inlet is positioned radially outward of the clean air outlet.

13. The shroud and hanger assembly of claim 12 wherein the cyclone body further comprises a conical portion and a cylindrical portion.

14. The shroud and hanger assembly of claim 13 wherein the shroud inlet is fluidly coupled to the clean air outlet at the cylindrical portion.

15. The shroud and hanger assembly of claim 13 wherein the scavenge outlet is located at the conical portion and fluidly separated from the shroud cooling circuit.

16. The shroud and hanger assembly of claim 12 further comprising a baffle positioned between the second surface of the hanger and the inner surface of the shroud and defining at least one of a pre-impingement cavity or a post-impingement cavity.

17. A turbine engine including a compressor, a combustor, and a turbine in axial flow arrangement, comprising:
a cooled component having an interior cooling passage and a heated surface facing a heated airflow; and
a hanger, comprising:
a first surface confronting a cooling airflow;
a second surface facing the heated airflow;
a third surface radially outward of the second surface;
a diagonal load brace along the third surface;
a cyclonic separator with a cyclone body having a conical portion and a cylindrical portion and defining a centerline parallel to the diagonal load brace, the cyclone body at least partially defined by the third surface and having a dirty air inlet, a clean air outlet, and a scavenge outlet positioned radially outward of the clean air outlet; and
a cooling air circuit fluidly coupled to the interior cooling passage, the cooling air circuit having a cooling air inlet on the first surface and a cooling air outlet on the second surface and extending through the cyclonic separator between the dirty air inlet and the clean air outlet.

18. The turbine engine of claim 17 wherein the cooled component comprises a portion of a casing surrounding at least one of the compressor, the combustor, or the turbine.

* * * * *